United States Patent [19]

Kishida et al.

[11] Patent Number: 4,487,890

[45] Date of Patent: Dec. 11, 1984

[54] PROCESS FOR PRODUCING IMPACT RESISTANT RESINS

[75] Inventors: Kazuo Kishida; Hiroshi Mohri, both of Ohtake, Japan

[73] Assignee: Mitsubishi Rayon Co., Ltd., Tokyo, Japan

[21] Appl. No.: 433,507

[22] Filed: Oct. 8, 1982

[30] Foreign Application Priority Data

Oct. 9, 1981 [JP] Japan .................................. 56-161233
Oct. 12, 1981 [JP] Japan .................................. 56-162376

[51] Int. Cl.$^3$ ................................................. C08F 8/00
[52] U.S. Cl. ....................................... 525/193; 525/67; 525/84; 525/85; 525/221; 525/228; 525/232; 525/264; 525/302
[58] Field of Search ............... 525/193, 221, 232, 228, 525/264, 302

[56] References Cited

U.S. PATENT DOCUMENTS 4,096,107 6/1978 Roberts et al. ...................... 525/193

*Primary Examiner*—Jacob Ziegler

*Attorney, Agent, or Firm*—Oblon, Fisher, Spivak, McClelland & Maier

[57] ABSTRACT

A process for producing an impact resistant graft polymer which comprises first polymerizing a portion of monomer mixture (b) consisting of specified unsaturated acid, alkyl acrylate having $C_1$-$C_{12}$ alkyl and other copolymerizable monomer (said portion of monomer mixture (b) does not contain said unsaturated acid), followed by consecutively polymerizing the residual portion of monomer mixture (b) (said residual portion of monomer mixture (b) contains said unsaturated acid) to obtain an acid residue-containing copolymer (B) latex, adding 0.1–5 parts by weight (as weight of solid component) of said acid residue-containing copolymer (B) latex to 100 parts by weight (as weight of solid component) of synthetic rubber (A) latex which has been adjusted to pH 7 or higher to obtain an agglomerated rubber (C) latex, and polymerizing 93–30 parts by weight of a grafting monomer (d) comprising 30% by weight or more of at least one monomer selected from styrene, acrylonitrile and methyl methacrylate in the presence of 7–70 parts by weight (as weight of solid component) of said agglomerated rubber (C) latex.

16 Claims, No Drawings

PROCESS FOR PRODUCING IMPACT RESISTANT RESINS

This invention relates to a novel process for producing an excellent impact resistant graft polymer which can be used in itself alone or in the form of a mixture with a thermoplastic resin.

The method for obtaining an impact resistant resin composition by introducing a rubber component into hard and brittle thermoplastic resin such as polystyrene, polymethyl methacrylate, styrene-acrylonitrile copolymer, polyvinyl chloride or the like has been well known for many years.

As the representatives of such impact resistant resin, there are known many ones such as ABS resin, high impact polystyrene and so on.

The object of this invention consists in obtaining a very excellent impact resistant resin by emulsion polymerization process with an industrial advantage.

An impact resistant resin composition can be obtained by polymerizing a monomer such as styrene, acrylonitrile, methyl methacrylate or the like in the presence of a rubber latex produced by emulsion polymerization. It is widely recognized that, in such cases, the particle diameter of rubber greatly governs the impact resistance and processability of the final product, and it is a well known fact that a larger particle diameter of rubber gives more improved impact resistance and processability.

Accordingly, as the rubber component used in impact resistant resins such as ABS resin, those having a larger particle diameter are preferred. However, the dispersed rubber particles in latices produced by the usual emulsion polymerization process have so small a particle size as $0.04-0.15\mu$, and the purpose cannot be achieved with such a small particle diameter. Therefore, various processes for producing rubber particle having a large particle diameter have been devised and reported.

However, hitherto known processes for producing large particle diameter rubber have many drawbacks. If an impact resistant resin is produced by such a process, there appear various further disadvantages. Generally speaking, the processes for producing large particle diameter rubber can be classified into two groups. One is the process of achieving the agglomeration of rubber particle in the course of polymerization of rubber, and the other is the process of agglomerating a rubber latex having a small particle size by an after treatment.

The most serious defect of the type of method in which rubber particles are agglomerated during the polymerization step is that an extremely long polymerization time is required to complete the polymerization. For instance, in order to obtain a rubber latex containing rubber particles having a particle diameter of approximately $0.3\mu$, it is necessary to continue the polymerization reaction for 48 to 100 hours. Further, it is almost impossible to produce a rubber having a particle diameter larger than $0.4\mu$ by this process, and production of large particle diameter rubber by this process is usually accompanied by formation of a large amount of undesirable coagulum. Further, if such a rubber is used for production of final resin, the formation of large amount of coagulum takes place also in the course of graft polymerization. On the other hand, if a rubber latex having a small particle diameter is after-treated to agglomerate the particles, the period of polymerization can be shortened to a great extent. As such process, agglomeration by the use of acid, agglomeration by the use of salt, ammonia-soap method, freezing method, solvent treatment, high pressure treatment, polymer colloid addition method, etc. are known. The most important disadvantage in the production of large particle diameter rubber and impact resistant resin by these processes consists in that special apparatus, assistants and reagents for the agglomeration of rubber particle must be used. If an impact resistant resin is produced from monomer and via rubber continuously and with economical advantage by such a process, a number of difficulties will be encountered. Although no particular apparatus is necessary for agglomerating rubber particles by the addition of an acid or a salt, such an agglomeration process is grounded on a partial destruction of the latex emulsion and therefore concentration of the aqueous solution of acid or salt, addition velocity of acid or salt and speed of stirring excercise great influence upon the agglomeration behavior of particles. Usually, the formation of excessively large particles (coagulum) cannot be prevented, and it is impossible to produce a rubber having a particle size of $0.3\mu$ or more without formation of coagulum, even though rubbers having a particle size of about $0.2\mu$ can be produced by such processes with relative ease. Further, the addition of the aqueous solution of acid or salt causes lowering of the solid concentration of latex which brings about a decrease in productivity.

Previously, the present inventors discovered a very excellent process for agglomerating rubber particles, and proposed a resin composition obtainable by a continuous graft polymerization using this agglomeration process (U.S. Pat. No. 3,944,630). According to the process, the aimed composition having an excellent impact resistance could be obtained without drawbacks of the prior known processes and in a very short period of time (10–20 hours from the stage of polymerization of rubber monomer to the completion of graft polymerization).

The present invention is an improvement of the above-mentioned patent application, and its object consists in providing a novel excellent impact resistant resin composition economically with an industrial advantage.

Thus, the essential feature of this invention consists in a process for producing an impact resistant graft polymer which comprises polymerizing a 5–90% (by weight) portion of monomer group (b) consisting of 3–30% by weight of at least one $\alpha,\beta$-unsaturated carboxylic acid selected from the group consisting of acrylic acid, methacrylic acid, itaconic acid and crotonic acid, 97–35% by weight of at least one alkyl acrylate having $C_1-C_{12}$ alkyl group and 0–48% by weight of other copolymerizable monomer (said 5–90% (by weight) portion of monomer group (b) does not contain said $\alpha,\beta$-unsaturated carboxylic acid), followed by consecutively polymerizing the residual 95–10% (by weight) portion of monomer group (b) (said residual 95–10% (by weight) portion of monomer group (b) contains said $\alpha,\beta$-unsaturated carboxylic acid) without forming any new particles to obtain an acid residue-containing copolymer (B) latex having an average particle diameter of $0.05-0.2\mu$, adding 0.1–5 parts by weight (as weight of solid component) of said acid residue-containing copolymer (B) latex to 100 parts by weight (as weight of solid component) of synthetic rubber (A) latex which has been adjusted to pH 7 or higher to obtain an agglomerated rubber (C) latex having a particle diameter of at least $0.2\mu$, and then polymerizing 93–30 parts by weight of grafting monomer (d) consisting of 30% by weight or more of at least one monomer selected from the group consisting of styrene, acrylonitrile and methyl methacrylate and 70% by weight or less of a monomer having $CH_2=C<$ copolymerizable therewith in the presence of 7–70 parts by weight (as weight of solid component) of said agglomerated rubber (C) latex.

The production process of this invention will be mentioned below in more detail.

Examples of said rubber component (A) include polybutadiene; copolymers comprising 50% by weight or more of 1,3-butadiene unit such as butadiene-monoethylenically unsaturated aromatic monomer copolymers (for example, butadiene-styrene copolymer, butadiene-vinyltoluene copolymer and butadiene-α-methylstyrene copolymer), butadiene-unsaturated nitrile monomer copolymers (for example, butadiene-acrylonitrile copolymer and butadiene-methacrylonitrile copolymer), butadiene-acrylate copolymers (for example, butadiene-methyl acrylate copolymer and butadiene-n-butyl acrylate copolymer) and butadiene-methacrylate copolymers (for example, butadiene-methyl methacrylate copolymer and butadiene-ethyl methacrylate copolymer); terpolymers and multi-polymers comprising 50% by weight or more of butadiene unit; polychloroprene and polychloroprene copolymers; homopolymers and copolymers comprising 50% by weight or more of alkyl acrylate unit having $C_1$–$C_{12}$ alkyl group; and so on. They can easily be obtained by the usual emulsion polymerization process. Catalyst and emulsifier used in the polymerization are not particularly limited, and the average particle diameter of the polymer in the latex is in the range of 0.04–0.15μ. Synthetic rubbers of which average particle diameter is in the range of 0.15–0.2μ are also usable for producing the aimed resin by the application of this invention. Usually, however, production of synthetic rubbers having a particle diameter of 0.15–0.2μ takes a considerably long period of time, which is uneconomical.

Next, the copolymer (B) latex comprising acrylic acid, methacrylic acid, itaconic acid or crotonic acid is used for the purpose of agglomerating the synthetic rubber latex. It is an indispensable condition of this invention that this acid residue-containing copolymer (B) has a form of latex. It is another indispensable condition of this invention that this acid residue-containing copolymer (B) comprises an α,β-unsaturated carboxylic acid and an alkyl acrylate. If other monomers such as alkyl methacrylate, styrene, acrylonitrile or the like is used in place of the alkyl acrylate, no effect can be exhibited at all. However, it is possible to replace one half or less the amount of said alkyl acrylate with other vinyl monomers.

Said α,β-unsaturated carboxylic acid is used in an amount of 3–30% by weight. If its amount is less than 3% by weight, the agglomerating ability is small. If amount exceeds 30% by weight, the agglomerating ability is too strong and is undesirable because such very strong ability causes the formation of excessively large particles having a diameter greater than 1μ.

The optimum content of said α,β-unsaturated carboxylic acid varies depending upon the hydrophilic character of the alkyl acrylate used in this invention. When the alkyl acrylate has a high hydrophilic character, the agglomerating effect appears in the region that the amount of α,β-unsaturated carboxylic acid is small, while an increasing amount of α,β-unsaturated carboxylic acid causes destruction of latex which is undesirable. On the contrary, when hydrophilic character of the alkyl acrylate is low, the agglomerating effect is small in the region that the amount of α,β-unsaturated carboxylic acid is small, and the effect can be exhibited only after the amount of the α,β-unsaturated carboxylic acid has exceeded a certain value. For example, in the cases of methyl acrylate and ethyl acrylate which have a high hydrophilic character, the optimum amount of α,β-unsaturated carboxylic acid is 5–10%, while in the cases of hydrophobic alkyl acrylates having $C_4$ or higher alkyl such as butyl acrylate and 2-ethylhexyl acrylate, the optimum amount of α,β-unsaturated carboxylic acid is 13–20%. Additionally, the use of highly hydrophilic acrylates has a drawback that their use tends to make the system unstable and therefore tends to form macro-agglomerates (coagulum) even if the amount of α,β-unsaturated carboxylic acid is in the range of 5–10%, whereas the use of the above-mentioned hydrophobic acrylates does not make the system unstable so that uniformly agglomerated particles can be obtained by their use in many cases.

As α,β-unsaturated carboxylic acid or similar monomer, cinnamic acid, maleic acid anhydride, butene-tricarboxylic acid and the like can also be referred to in addition to above. However, they are not practical because the agglomerating ability is not great when they are used.

It is necessary that the acid residue-containing copolymer (B) latex used in this invention is a latex having a double layer structure which can be obtained by first polymerizing a 5–90% (by weight) portion of monomer group (b) consisting of 3–30% by weight of at least one α,β-unsaturated carboxylic acid selected from the group consisting of acrylic acid, methacrylic acid, itaconic acid and crotonic acid, 97–35% by weight of at least one alkyl acrylate having $C_1$–$C_{12}$ alkyl and 0–48% by weight of other copolymerizable monomers (said 5–90% (by weight) portion of monomer group (b) does not contain said α,β-unsaturated carboxylic acid) and consecutively polymerizing the residual 95–10% (by weight) portion of monomer group (b) (said residual 95–10% (by weight) portion contains said α,β-unsaturated carboxylic acid) without forming any new particles. As said "other copolymerizable monomers", there can be referred to unsaturated aromatic compounds such as styrene, α-methylstyrene and vinyltoluene; unsaturated nitrile compounds such as acrylonitrile and methacrylonitrile; and alkyl methacrylates having $C_1$–$C_{12}$ alkyl group.

Among the monomer groups satisfying the above-mentioned conditions, those comprising 80–90% by weight of n-butyl acrylate and 10–20% by weight of methacrylic acid are particularly preferable.

As the emulsifier used in the production of acid residue-containing copolymer, anionic surfactants are particularly preferable, though nonionic surfactants can also be used.

The particle diameter of acid residue-containing copolymer latex exercises a great influence on the agglomerating ability. Particularly preferable particle diameter is 0.05μ to 0.2μ.

The acid residue-containing copolymer in the form of a latex is added to the synthetic rubber (A) latex. If an inorganic electrolyte is simultaneously added with it, the particle diameter of synthetic rubber (A) can be agglomerated quite effectively and stably.

The amount of the added acid residue-containing copolymer latex is 0.1-5 parts by weight (as weight of solid component) and particularly preferably 0.5-3 parts by weight per 100 parts by weight (as weight of solid component) of synthetic ruber (A).

As for the amount of the added inorganic electrolyte, an amount of 0.05-4.0 parts by weight and particularly preferably 0.1-1.0 part by weight per 100 parts by weight (as weight of solid component) of synthetic rubber (A) is enough for the purpose. By adding such a slight quantity of inorganic electrolyte, the agglomeration of synthetic rubber (A) can be made to progress effectively.

As said inorganic electrolyte, neutral inorganic salt such as KCl, NaCl, $Na_2SO_4$ and the like are preferably useable.

It is also possible to add said inorganic electrolyte beforehand at the time of preparing the synthetic rubber (A) latex by polymerization, by which there can be exhibited an effect equal to the effect achievable by adding it at the time of agglomeration.

In practising the agglomerating treatment of this invention, it is necessary to keep the pH value of synthetic rubber (A) latex at a value not smaller than 7, and particularly in the range of 7-13. If the pH is in tha acidic region, the efficiency of agglomeration is low even if acid residue-containing copolymer (B) latex is added, so that the composition constituting the object of this invention cannot be produced advantageously.

Adjustment of pH value of synthetic rubber (A) latex to 7 or higher may be carried out in the course of polymerizing synthetic rubber or may be carried out before the agglomerating treatment.

Then, 93-30 parts by weight of grafting monomer consisting mainly of styrene, acrylonitrile or methyl methacrylate is polymerized in the presence of 7-70 parts by weight of the agglomerated rubber (C) latex which has been subjected to agglomerating treatment in the above-mentioned manner, whereby the intended impact resistant resin can be obtained. The monomer to be grafted to agglomerated rubber (C) latex is a grafting monomer consisting of 30% by weight or more of at least one monomer selected from the group consisting of styrene, acrylonitrile and methyl methacrylate and 70% by weight or less of a monomer having $CH_2=<$ copolymerizable therewith. Concretely, styrene alone, acrylonitrile alone or methyl methacrylate alone may be used for this purpose, and concrete examples of the copolymerizable monomer having $CH_2=C<$ include unsaturated aromatic compounds such as styrene, α-methylstyrene, vinyltoluene and the like; unsaturated nitrile compounds such as acrylonitrile and methacrylonitrile; alkyl methacrylates having $C_1-C_{12}$ alkyl group; and alkyl acrylates having $C_1-C_{12}$ alkyl group.

As grafting monomer (d) a mixture consisting of these monomers, styrene-acrylonitrile monomer mixture, styrene-acrylic ester monomer mixture, methylmethacrylate-acrylonitrile monomer mixture, methyl methacrylate-acrylic ester monomer mixture, acrylonitrile-acrylic ester monomer mixture and the like can be referred to. Monomer mixtures prepared by mixing three or more of these monomers can also be used. Among them, a monomer mixture consisting of 85-60% by weight of styrene and 15-40% by weight of acrylonitrile is particularly preferable, beside which a monomer mixture consisting of 40-65% by weight of styrene, 10-60% by weight of methyl methacrylate and 0-30% by weight of acrylonitrile, a monomer mixture consisting of 40-70% by weight of styrene, 5-40% by weight of methyl methacrylate and 5-40% by weight of acrylonitrile, methyl methacrylate alone or a monomer mixture comprising 60% by weight or more of methyl methacrylate, acrylonitrile alone or a monomer mixture comprising 60% by weight or more of acrylonitrile, and the like can also be used preferably. In this emulsion graft polymerization, known emulsifier and catalyst are usually employed, and their kinds and amounts are not particularly limited.

If the content of the agglomerated rubber in the impact resistant graft polymer of this invention is less than 7% by weight, the graft polymer is low in impact resistance so that it has no practical value. If the content of agglomerated rubber is larger than 70% by weight, the impact resistant graft polymer is poor in flow property and processability, which is undesirable.

If a resin containing no rubber is blended into said graft polymer, a resin composition having a high impact resistance can be obtained. In this case, the content of agglomerated rubber in the base graft polymer may be out of the above-mentioned range of 7-70% by weight. However, in the final resin composition, the content of agglomerated rubber is preferably in the range of 3-40% by weight. As the resin containing no rubber usable in this case, polystyrene, polymethyl methacrylate, AS resin, polyvinyl chloride, polycarbonate and the like can be referred to. In the present invention, polystyrene includes a homopolymer or copolymers comprising 50% by weight or more of styrene unit; polymethyl methacrylate includes a homopolymer or copolymers comprising 50% by weight or more of methyl methacrylate unit; polyvinyl chloride includes a homopolymer or copolymers comprising 50% by weight or more of vinyl chloride unit; polycarbonate includes a homopolymer or copolymers comprising 50% by weight or more of carbonate unit.

When the grafting monomer is graft-polymerized with agglomerated rubber, the grafting monomer may be added at once, or it may also be added in portions or continuously. It is also allowable to graft-polymerize each of the monomers stepwise.

Into the graft polymer or resin composition thus obtained, known antioxidant, lubricant, colorant, filler and the like may be incorporated.

As compared with hitherto known thermoplastic resin compositions, the impact resistant graft polymer of this invention has the following advantages:

1. The steps from the polymerization of rubber to the polymerization of final graft polymer can be practised in a one-through and continuous manner.

2. It does not necessitate use of any special apparatus.

3. The polymerization of rubber can be practised in a short period of time, so that productivity is markedly high.

4. The agglomerating treatment of rubber does not necessitate to use of any special dispersant or emulsifier, so that the process is economical and the final graft polymer has a good thermal stability.

5. The formation of macro-agglomerates (coagulum) is very slight in the agglomerating treatment and graft polymerization of rubber.

6. Rubber having a large particle diameter (0.4-1µ), difficult to obtain by usually known agglomeration process, can be obtained easily, so that a graft polymer having a very high impact strength can be obtained.

In the following examples, all "parts" and "%" mean "parts by weight" and "% by weight", respectively.

EXAMPLE 1 AND COMPARATIVE EXAMPLE 1

Synthesis of Synthetic Rubber

| (A-1) | |
|---|---|
| 1,3-Butadiene | 66 parts |
| Butyl acrylate | 9 parts |
| Styrene | 25 parts |
| Potassium oleate | 1.0 part |
| Potassium rosinate | 1.0 part |
| Diisopropylbenzene hydroperoxide | 0.2 part |
| Ferrous sulfate | 0.005 part |
| Sodium pyrophosphate | 0.5 part |
| Dextrose | 0.3 part |
| Water | 200 parts |

Using a mixture having the above-mentioned composition, polymerization was carried out at 50° C. in a 100 liter autoclave. The polymerization was nearly completed in 9 hours, and there was obtained a rubber latex having a particle diameter of $0.08\mu$ and a pH value of 9.0 at a conversion rate of 97%.

Synthesis of Acid Residue-Containing Copolymer Latex for Agglomeration

| (B-1) | |
|---|---|
| n-Butyl acrylate | 25 parts |
| Potassium oleate | 2 parts |
| Sodium dioctyl sulfosuccinate | 1 part |
| Cumene hydroperoxide | 0.1 part |
| Sodium formaldehyde-sulfoxylate | 0.3 part |
| Water | 200 parts |

A mixture having the above-mentioned composition was polymerized at 70° C. for 1.5 hours. Then, into the reaction mixture at 70° C. was dropped a mixture having the following composition:

| | |
|---|---|
| n-Butyl acrylate | 60 parts |
| Methacrylic acid | 15 parts |
| Cumene hydroperoxide | 0.3 part | over a time period of 1 hour. Then, the mixture was stirred for an additional 1 hour to obtain a copolymer latex having an average particle diameter of $0.08\mu$ at a conversion rate of 98%.

While stirring 100 parts (as weight of solid component) of rubber latex (A-1) in a vessel, a varied amount of latex (B-1) was added thereto at room temperature.

After stirring the latex mixture for 30 minutes, it was immediately sampled out. On the other hand, the latex mixture was allowed to stand for 5 days and then sampled out. After treating the samples with osmium tetratetraoxide, their particle diameters were measured by means of an electron microscope.

Further, stability of the agglomerated latex was also evaluated after standing for 1 month.

For comparison, a mixture having the following composition:

| (B-2) | |
|---|---|
| n-Butyl acrylate | 85 parts |
| Methacrylic acid | 15 parts |
| Potassium oleate | 2 parts |
| Sodium dioctyl sulfosuccinate | 1 part |
| Cumene hydroperoxide | 0.4 part |
| Sodium formaldehyde-sulfoxylate | 0.3 part |
| Water | 200 parts | was polymerized in one step to obtain latex (B-2) having an average particle diameter of $0.08\mu$, and it was also similarly evaluated.

These results are shown in Table 1.

TABLE 1

| | (B) latex Kind | Amount (parts) | KCl Amount (part) | Diameter of rubber particle ($\mu$) After 30 min | After 5 days | Stability after standing for 1 month (*) Coagulum larger than 200 mesh (%) | Mechanical stability (seconds) |
|---|---|---|---|---|---|---|---|
| Example 1-1 | (B-1) | 1.0 | 0 | 0.30 | 0.31 | 0 | 500 |
| 1-2 | " | 1.5 | 0 | 0.33 | 0.35 | 0 | >600 |
| 1-3 | " | 2.0 | 0 | 0.34 | 0.35 | 0 | >600 |
| 1-4 | " | 2.5 | 0 | 0.34 | 0.35 | 0.1 | >600 |
| 1-5 | " | 3.0 | 0 | 0.34 | 0.36 | 0.1 | 500 |
| 1-6 | " | 2.0 | 0.3 | 0.37 | 0.38 | 0.1 | >600 |
| Comparative Example 1-1 | (B-2) | 1.0 | 0 | 0.26 | 0.30 | 0.2 | 400 |
| 1-2 | " | 1.5 | 0 | 0.30 | 0.35 | 0.6 | 400 |
| 1-3 | " | 2.0 | 0 | 0.29 | 0.35 | 0.8 | 500 |
| 1-4 | " | 3.0 | 0 | 0.32 | 0.36 | 0.8 | 450 |

(*) Period of time required for starting coagulation in Maron's type of mechanical stability tester.

It is apparent from Table 1 that, as compared with a product prepared by merely copolymerizing acrylate and methacrylic acid, a product of which methacrylic acid content in the surface layer part has been enhanced by 2-step polymerization shows a higher agglomerating effect and can give an agglomerated latex much more improved in stability.

EXAMPLE 2 AND COMPARATIVE EXAMPLE 2

To 100 parts (as weight of solid component) of synthetic rubber latex (A-1) was added 1.5 parts (as weight of solid component) of latex (B-1) with stirring in 5 seconds.

Then, by using the above-mentioned agglomerated latex which had been stirred for 30 minutes, a graft polymerization was immediately carried out according to the following recipe to synthesize a graft polymer.

Synthesis of Graft Polymer

| | |
|---|---|
| Agglomerated rubber (as weight of solid component) | 60 parts |
| Styrene | 21 parts |
| Methyl methacrylate | 19 parts |
| Cumene hydroperoxide | 0.16 part |
| Sodium formaldehyde-sulfoxylate | 0.1 part |
| Potassium oleate | 1.0 part |
| Water | 200 parts |

-continued (Conditions of polymerization: 70° C., 4 hours)

To the resulting polymer latex was added 2 parts of butylated hydroxytoluene and 0.5 part of dilauryl thiopropionate as antioxidant, after which it was coagulated with 5% aqueous solution of sulfuric acid, washed and dried to obtain a white powder.

To 10 parts of this powder resin (G-1) were added 1.00 part of polyvinyl chloride (PVC) having a degree of polymerization of 700, 3.0 parts of dibutyltin maleate, 1.0 part of butyl stearate, 0.3 part of stearyl alcohol and 0.2 part of Hoechst wax OP. The resulting mixture was homogenized by means of mixing roll kept at 165° C. and then press-molded at 180° C. under a pressure of 150 kg/cm² for 15 minutes. Charpy impact strength of the molded product was measured to obtain the results shown in Table 2.

For comparison, latex (B-2) was similarly processed and the product was similarly evaluated.

TABLE 2

| | Example 2 | Comparative Example 2 |
|---|---|---|
| Impact strength of PVC blend* (kg · cm/cm²) | 49.0 | 32.4 |

*Impact strength: Charpy impact strength

It is apparent from Table 2 that a higher impact strength of graft polymer-PVC blend can be manifested by forming the agglomerating agent into a structure of double layer.

EXAMPLE 3

As the acid residue-containing copolymer latex for agglomeration, a copolymer latex (B-3) having an average particle diameter of 0.08μ of which first layer (inner layer) was constituted of 20 parts of butyl acrylate and 5 parts of methyl methacrylate and of which second layer (outer layer) was constituted of 62.5 parts of butyl acrylate and 12.5 parts of methacrylic acid was synthetized according to a recipe similar to that of (B-1) in Example 1, and its agglomerating effects on various synthetic rubbers were examined to obtain the results shown in Table 3.

TABLE 3

| Example | Synthetic rubber used as base Composition | pH of rubber latex | Particle diameter (μ) | Amount of latex (B-3) (parts)* | Particle diameter after agglomeration (μ) |
|---|---|---|---|---|---|
| 3-1 | Polybutadiene | 8.4 | 0.06 | 1.5 | 0.32 |
| 3-2 | Bd/BA = 70/30 | 9.2 | 0.07 | 1.5 | 0.34 |
| 3-3 | BA/MA = 85/15 | 8.4 | 0.10 | 1.5 | 0.32 |
| 3-4 | BA/MMA = 85/15 | 8.4 | 0.10 | 2.0 | 0.34 |
| 3-5 | Bd/St/AN = 70/10/20 | 8.6 | 0.13 | 1.5 | 0.33 |
| 3-6 | BA/EDMA = 95/5 | 8.0 | 0.08 | 2.0 | 0.35 |

Bd: Butadiene;
BA: Butyl acrylate;
MA: Methyl acrylate;
MMA: Methyl methacrylate
St: Styrene;
AN: Acrylonitrile;
EDMA: Ethylene glycol dimethacrylate (These abbreviations are the same throughout the following examples.)
*Amount of latex (B-3) added per 100 parts (weight of solid component) of synthetic rubber.

EXAMPLE 4

As the acid residue-containing copolymer latex for agglomeration, a copolymer latex (B-4) having an average particle diameter of 0.08μ of which first layer (inner layer) was constituted of 20 parts of butyl acrylate and 5 parts of methyl methacrylate and of which second layer (outer layer) was constituted of 60 parts of butyl acrylate and 15 parts of methacrylic acid was synthetized according to a recipe similar to that of (B-1) in Example 1.

Various synthetic rubbers were agglomerated with this latex (B-4), and the monomers shown in Table 4 were graft-polymerized in the presence of 20 parts of one of these agglomerated rubbers. Impact strengths of the resulting graft polymers were as shown in Table 4.

TABLE 4

| Example Nos. | Composition of synthetic rubber | pH of rubber latex | Amount of latex (B-4) (parts)*1 | Composition of grafting monomer | Impact strength (kg · cm/cm²)*2 |
|---|---|---|---|---|---|
| 4-1 | Polybutadiene | 8.4 | 2.0 | AN/St = 30/70 | 45.2 |
| 4-2 | Bd/MMA = 80/20 | 9.2 | 2.0 | MMA/St = 80/20 | 29.1 |
| 4-3 | Bd/AN = 75/25 | 8.6 | 2.5 | AN/MA = 80/20 | 51.8 |

*1Amount of latex (B-4) per 100 parts (weight of solid component) of synthetic rubber
*2Izod impact strength

EXAMPLE 5 AND COMPARATIVE EXAMPLE 3

Preparation of Acrylic Rubber (A-2) Latex

| Deionized water | 200 parts |
|---|---|
| Potassium oleate | 5.0 parts |
| Methyl methacrylate | 4 parts |
| Styrene | 12 parts |
| Acrylonitrile | 12 parts |
| n-Butyl acrylate | 72 parts |
| Triallyl isocyanurate | 0.5 part |
| Potassium persulfate | 0.6 part |

A mixture having the above-mentioned composition was polymerized at 70° C. over a period of 4 hours. The rate of polymerization was 96%. The elastomer latex thus obtained had an average particle diameter of 0.09μ and a pH value of 9.1.

While stirring 100 parts (as weight of solid component) of latex (A-2) in a vessel, 20 parts (as weight of solid component) of latex (B-1) was added at room temperature. After stirring the latex mixture for 30 minutes, it was immediately sampled out. Further, after allowing it to stand for 5 days, it was again sampled out. Average particle diameters of the samples were measured to obtain the results shown in Table 5.

Synthesis of Graft Polymer (G-1)

Using the above-mentioned agglomerated latex which had been stirred for 30 minutes, a graft polymerization was immediately carried out at 80° C. for 4 hours according to the following recipe to synthesize a graft polymer.

| | |
|---|---|
| Agglomerated rubber (as weight of solid component) | 60 parts |
| Methyl methacrylate | 8 parts |
| Acrylonitrile | 8 parts |
| Styrene | 24 parts |
| n-Octylmercaptan | 0.04 part |
| Potassium persulfate | 0.2 part |
| Potassium oleate | 1.0 part |

Evaluation of Properties

Fifty parts of the graft polymer obtained above was blended with 50 parts of suspension particles which had been prepared elsewhere from a monomer mixture (MMA/AN/St=20/20/60% by weight), so that content of acrylic rubber in the total resin composition came to 30%. Further 1 part of barium stearate and 0.1 part of Tinuvin P(trade name of ultraviolet absorber manufactured by Ciba Geigy) were added to this resin composition, and the resulting mixture was pelletized by means of an extruder. From the pellets, various test pieces were prepared by injection molding, with which various properties were measured to obtain the results shown in Table 5. In Table 5, notched Izod strength was measured according to ASTM-D-256; melt index (MI) was estimated by measuring gram number of the polymer flowing out at 200° C. in a period of 10 minutes under a load of 5 kg; and surface gloss was estimated by forming a flat plate having a thickness of ⅛ inch and measuring its specular gloss at incidence and reflection angles of 60° according to ASTM-D 523-62 T. As comparative example, various test pieces were prepared by repeating the above-mentioned procedure except that (B-1) latex was replaced by (B-2) latex, and properties were evaluated with these test pieces. The results are also shown in Table 5.

TABLE 5

| | Diameter of rubber particle (μ) | | | Notched izod impact strength (kg · cm/cm²) | Melt index (MI) (g/10 min.) | Surface gloss | Surface appearance of molded article |
|---|---|---|---|---|---|---|---|
| | Initial diameter | After agglomeration for 30 min. | for 5 days | | | | |
| Example 5 | 0.09 | 0.28 | 0.29 | 28.8 | 1.4 | 94.5 | |
| Comparative Example 3 | 0.09 | 0.24 | 0.26 | 24.7 | 1.2 | 92.1 | |

EXAMPLE 6 AND COMPARATIVE EXAMPLES 4-6

An acrylic ester copolymer rubber (A-3) latex was synthesized according to the following recipe:

| | |
|---|---|
| n-Butyl acrylate | 95 parts |
| Styrene | 5 parts |
| Tetraethylene glycol dimethacrylate | 0.7 part |
| n-Lauryl sodium sarcosinate | 2 parts |
| Potassium persulfate | 0.6 part |
| Water | 200 parts |

Thus, a mixture having the above-mentioned composition was polymerized at 70° C. After 5 hours, there was obtained a latex having a particle diameter of 0.07μ and a pH value of 7.2.

To 100 parts (as weight of solid component) of this (A-3) rubber latex was added 2.0 parts (as weight of solid component) of (B-1) latex at room temperature to obtain an agglomerated rubber latex. After stirring the agglomerated rubber latex for 30 minutes, a graft polymerization was immediately carried out at 80° C. for 4 hours according to the following recipe to obtain a graft polymer.

| | |
|---|---|
| Agglomerated rubber (as weight of solid component) | 55 parts |
| Acrylonitrile | 11.25 parts |
| Styrene | 33.75 parts |
| n-Octylmercaptan | 0.04 part |
| Disproportionated rosin acid soap | 1.0 part |
| Potassium oleate | 1.0 part |
| Cumene hydroperoxide | 0.15 part |
| Sodium formaldehyde-sulfoxylate | 0.15 part |

The graft polymer thus obtained was blended with AS resin, polycarbonate or polymethyl methacrylate in the proportion shown in Table 6 to obtain a resin composition, and the latter was formed into a plate. Notched impact strength of the plate was measured to obtain the results shown in Table 6. As comparative examples, the abovementioned procedures and evaluation were repeated, except that (B-1) latex was replaced by (B-2) latex. The results are also shown in Table 6.

TABLE 6

| | | Resin Composition | | Notched Izod impact strength (kg · cm/cm²) |
|---|---|---|---|---|
| | Kind of resin | Amount of resin (parts) | Amount of graft polymer (parts) | |
| Example 6-1 | AS resin (AN/St = 29/71 by wt.) | 50 | 50 | 38.5 |
| Comparative | As resin | " | " | 21.0 |

TABLE 6-continued

| | Resin Composition | | | Notched Izod impact strength (kg · cm/cm$^2$) |
|---|---|---|---|---|
| | Kind of resin | Amount of resin (parts) | Amount of graft polymer (parts) | |
| Example 4 | (AN/St = 29/71 by wt.) | | | |
| Example 6-2 | Polycarbonate | 70 | 30 | 31.4 |
| Comparative Example 5 | " | " | " | 20.7 |
| Example 6-3 | Polymethyl methacrylate | 50 | 50 | 6.8 |
| Comparative Example 6 | " | " | " | 2.3 |

What is claimed is:

1. A process for producing an impact resistant graft polymer which comprises:
    (a) forming an acid residue-containing copolymer (B) latex from a monomer group (b) consisting of at least one, α, β-unsaturated carboxylic acid selected from the group of acrylic acid, methacrylic acid, itaconic acid and crotonic acid; at least one alkyl acrylate having a C$_1$-C$_{12}$ alkyl group and one or more copolymerizable monomers; by first, emulsion polymerizing a 5 to 90% by wt. portion of said monomer group (b) consisting of a monomer selected from the group of at least one alkyl acrylate having a C$_1$-C$_{12}$ alkyl group, and at least one alkyl acrylate having a C$_1$-C$_{12}$ alkyl group with one or more copolymerizable monomers which do not include the α, β-unsaturated carboxylic acid monomers; and then consecutively emulsion polymerizing the residual 95 to 10% by wt. portion of the monomer group (b) consisting of at least one of the α, β-unsaturated carboxylic acids selected from the group consisting of acrylic acid, methacrylic acid, itaconic acid and crotonic acid, at least one of the alkyl acrylates selected from the group of C$_1$-C$_{12}$ alkyl acrylates, and one or more of the copolymerizable monomers such that the formed copolymer (b) latex consists of 3 to 30% by wt. of said, α, β-unsaturated carboxylic acid monomer component, 97 to 35% by wt. of the alkyl acrylate monomer or monomers component, and 0 to 48% by wt. of the one or more of the copolymerizable monomer components;
    (b) adding 0.1 to 5 parts by weight of said copolymer (B) latex to 100 parts by weight of synthetic rubber (A) latex which has been adjusted to pH 7 or higher to obtain an agglomerated rubber (C) latex, wherein a larger portion is an elastomer constituting the synthetic rubber (A) and a smaller portion is the copolymer (B) latex incorporated therein, and wherein said agglomerated rubber (C) latex has a particle diameter of at least 0.2 microns; and then
    (c) emulsion polymerizing 93 to 30 parts by weight of grafting monomer (d) consisting of 30% by wt. or more of at least one monomer selected from the group consisting of styrene, acrylonitrile and methylmethacrylate and 70% by wt. or less of a monomer selected from the group consisting of styrene, α-methylstyrene, vinyltoluene, acrylonitrile, methacrylonitrile, alkyl methacrylates having a C$_1$-C$_{12}$ alkyl group and alkyl acrylates having a C$_1$-C$_{12}$ alkyl group copolymerizable therewith in the presence of 7 to 70 parts by weight of said agglomerated rubber (C) latex.

2. A process for producing an impact resistant graft polymer according to claim 1, wherein said synthetic rubber (A) is polybutadiene.

3. A process for producing an impact resistant graft polymer according to claim 1, wherein said synthetic rubber (A) is a copolymer comprising 50% by weight or more of 1,3-butadiene.

4. A process for producing an impact resistant graft polymer according to claim 1, wherein said synthetic rubber (A) is a homopolymer or a copolymer comprising 50% by weight or more of alkyl acrylate having C$_1$-C$_{12}$ alkyl group.

5. A process for producing an impact resistant graft polymer according to claim 1, wherein pH value of said synthetic rubber (A) latex is in the range of 7-13.

6. A process for producing an impact resistant graft polymer according to claim 1, wherein said synthetic rubber (A) has an average particle diameter of 0.04-0.15μ.

7. A process for producing an impact resistant graft polymer according to claim 1, wherein said grafting monomer (d) consists of 85-60% by weight of styrene and 15-40% by weight of acrylonitrile.

8. A process for producing an impact resistnat graft polymer according to claim 1, wherein the amount of said agglomerated rubber (C) latex is 40-70 parts by weight (as weight of solid component) and said grafting monomer (d) consists of 40-65% by weight of styrene, 10-60% by weight of methyl methacrylate and 0-30% by weight of acrylonitrile, and the amount of said grafting monomer (d) is 60-30 parts by weight.

9. A process for producing an impact resistant graft polymer according to claim 3, wherein said grafting monomer (d) consists of 40-70% by weight of styrene, 5-40% by weight of methyl methacrylate and 5-40% by weight of acrylonitrile.

10. A process for producing an impact resistant graft polymer according to claim 4, wherein said grafting monomer (d) is methyl methacrylate alone or a monomer mixture comprising at least 60% by weight of methyl methacrylate.

11. A process for producing an impact resistant graft polymer according to claim 1, wherein said grafting monomer (d) is acrylonitrile alone or a monomer mixture comprising at least 60% by weight of acrylonitrile.

12. A process for producing an impact resistant graft polymer according to claim 1, wherein said acid residue-containing copolymer (B) latex consists of 80 to 90% by wt. of n-butyl acrylate and 10 to 20% by wt. of methacrylic acid.

13. A process for producing an impact resistant graft polymer according to claim 1, wherein said acid residue-containing copolymer (B) latex has an average particle diameter of 0.05 to 0.2 microns.

14. A process for producing an impact resistant graft polymer according to claim 1 which comprises additionally adding 0.05–4 parts by weight of an inorganic electrolyte selected from the group consisting of KCl, NaCl and Na$_2$SO$_4$ to 100 parts by weight of synthetic rubber (A) latex.

15. A process for producing an impact resistant graft polymer according to claim 1, wherein the amount of said copolymerizable monomer having CH$_2$=C< in the grafting monomer (d) is 30% by weight or less.

16. A process for producing an impact resistant polymer according to claim 1, wherein said acid residue-containing copolymer (B) latex consists of 80 to 90% by wt. of n-butyl acrylate and 10 to 20% by wt. of methacrylic acid, and has an average particle diameter of 0.05 to 0.2 microns.

* * * * *